(12) United States Patent
Tiger (10) Patent No.: US 10,352,008 B2
(45) Date of Patent: Jul. 16, 2019

(54) DOG FECES COLLECTING APPARATUS AND DISPOSABLE BAG THEREFOR

(71) Applicant: MOSHE TIGER LTD., Nes Ziona (IL)

(72) Inventor: Moshe Tiger, Nes Ziona (IL)

( * ) Notice: Subject to any disclaimer, the term of this patent is extended or adjusted under 35 U.S.C. 154(b) by 0 days.

(21) Appl. No.: 15/781,158

(22) PCT Filed: Nov. 21, 2016

(86) PCT No.: PCT/IL2016/051253
§ 371 (c)(1),
(2) Date: Jun. 4, 2018

(87) PCT Pub. No.: WO2017/098498
PCT Pub. Date: Jun. 15, 2017

(65) Prior Publication Data
US 2018/0347131 A1    Dec. 6, 2018

(30) Foreign Application Priority Data

Dec. 9, 2015    (IL) .......................................... 242989

(51) Int. Cl.
*E01H 1/12*    (2006.01)
*A01K 23/00*    (2006.01)

(52) U.S. Cl.
CPC .......... *E01H 1/1206* (2013.01); *A01K 23/005* (2013.01); *E01H 2001/126* (2013.01); *E01H 2001/128* (2013.01); *E01H 2001/1293* (2013.01)

(58) Field of Classification Search
CPC .......... E01H 1/1206; E01H 2001/1286; E01H 2001/128; E01H 2001/1226; E01H 2001/1293; E01H 2001/126; A01K 23/005

See application file for complete search history.

(56) References Cited

U.S. PATENT DOCUMENTS

| | | | |
|---|---|---|---|
| 3,733,098 A | 5/1973 | Tobias | |
| 6,983,966 B2 * | 1/2006 | Azrikam | E01H 1/1206 294/1.4 |
| 7,063,365 B1 * | 6/2006 | Chase | E01H 1/1206 294/1.3 |
| 7,448,659 B1 | 11/2008 | Auseklis | |
| 7,686,361 B1 * | 3/2010 | Flinn | E01H 1/1206 294/1.4 |
| 7,866,717 B2 * | 1/2011 | Martinez | E01H 1/1206 15/257.6 |
| 8,292,339 B1 | 10/2012 | Auseklis | |
| 8,714,604 B1 * | 5/2014 | Mihalic | E01H 1/1206 294/1.4 |
| 2008/0265592 A1 * | 10/2008 | Askinasi | E01H 1/1206 294/1.4 |

FOREIGN PATENT DOCUMENTS

DE    202008007365 U1    10/2008

\* cited by examiner

*Primary Examiner* — Stephen A Vu
(74) *Attorney, Agent, or Firm* — Alphapatent Associates, Ltd; Daniel J. Swirsky (57) ABSTRACT

A dog feces collecting apparatus (10), including: at least two jaws (14*a*, 14*b*), being rotatable (40) one in relation to the other; and a disposable bag (16), comprising: means (22, 17, 19), for manually connecting the disposable bag (16) to the jaws (14*a*, 14*b*) while the ends (36*a*, 36*b*) of the jaws (14*a*, 14*b*) are drawn apart one from the other; and attaching means (20*a*, 20*b*, 17, 19), for attaching portions of the disposable bag (16) meeting one another upon meeting of ends (36*a*, 36*b*) of the jaws (14*a*, 14*b*), thereby upon drawing the ends (36*a*, 36*b*) of the least two jaws (14*a*, 14*b*) apart one from the other, the attaching means (20*a*, 20*b*, 17, 19) removes the disposable bag (16) from at least one of the jaws (14*a*, 14*b*).

8 Claims, 10 Drawing Sheets

DOG FECES COLLECTING APPARATUS AND DISPOSABLE BAG THEREFOR

CROSS-REFERENCE TO RELATED APPLICATIONS

This application is a U.S. National Phase Application under 35 U.S.C. 371 of International Application No. PCT/IL2016/051253, which has an international filing date of Nov. 21, 2016, and which claims the benefit of priority from Israel Patent Application No. 242,989, filed Dec. 9, 2015, the disclosure of which is incorporated herein by reference in its entirety.

TECHNICAL FIELD

The invention relates to the field of dog feces collection. More particularly, the invention relates to an apparatus and bag thereof.

BACKGROUND

CN201424641 discloses a dog feces collecting apparatus including two jaws.

However, CN201424641 does not provide a solution for replacing a bag, to be placed between the jaws.

The invention provides a solution to the above-mentioned and other problems of the prior art.

SUMMARY

In one aspect, the invention is directed to a dog feces collecting apparatus (10), including:
- at least two jaws (14a, 14b), being rotatable (40) one in relation to the other; and
- a disposable bag (16), comprising:
  a) means (22, 17, 19), for manually connecting the disposable bag (16) to the jaws (14a, 14b) while the ends (36a, 36b) of the jaws (14a, 14b) are drawn apart one from the other; and
  b) attaching means (20a, 20b, 17, 19), for attaching portions of the disposable bag (16) meeting one another upon meeting of ends (36a, 36b) of the jaws (14a, 14b), thereby upon drawing the ends (36a, 36b) of the least two jaws (14a, 14b) apart one from the other, the attaching means (20a, 20b, 17, 19) removes the disposable bag (16) from at least one of the jaws (14a, 14b).

BRIEF DESCRIPTION OF THE DRAWINGS

Embodiments, features, and aspects of the invention are described herein in conjunction with the following drawings.

The drawings are not necessarily drawn to scale.

DETAILED DESCRIPTION

The invention will be understood from the following detailed description of embodiments of the invention, which are meant to be descriptive and not limiting. For the sake of brevity, some well-known features, methods, systems, procedures, components, circuits, and so on, are not described in detail.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

Figure 1:
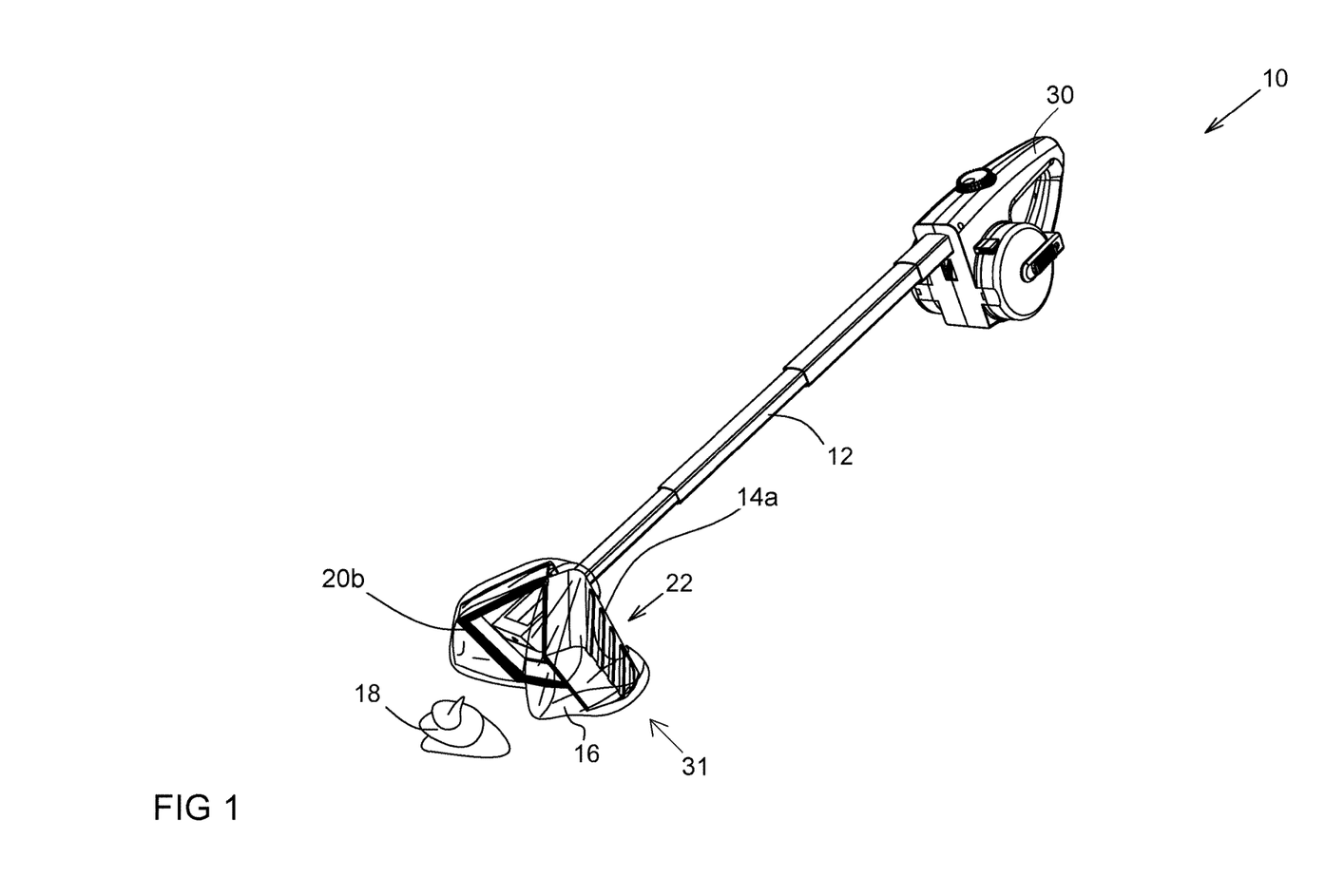
FIG. 1 is a perspective view of a dog feces collecting apparatus according to one embodiment of the invention, prior to collecting the dog feces.

FIG. 1 is a perspective view of a dog feces collecting apparatus according to one embodiment of the invention, prior to collecting the dog feces.

A dog feces collecting apparatus 10 includes a handle 30, from which extends a telescopic rod 12, ending with a jaws assembly 31.

Figure 2:
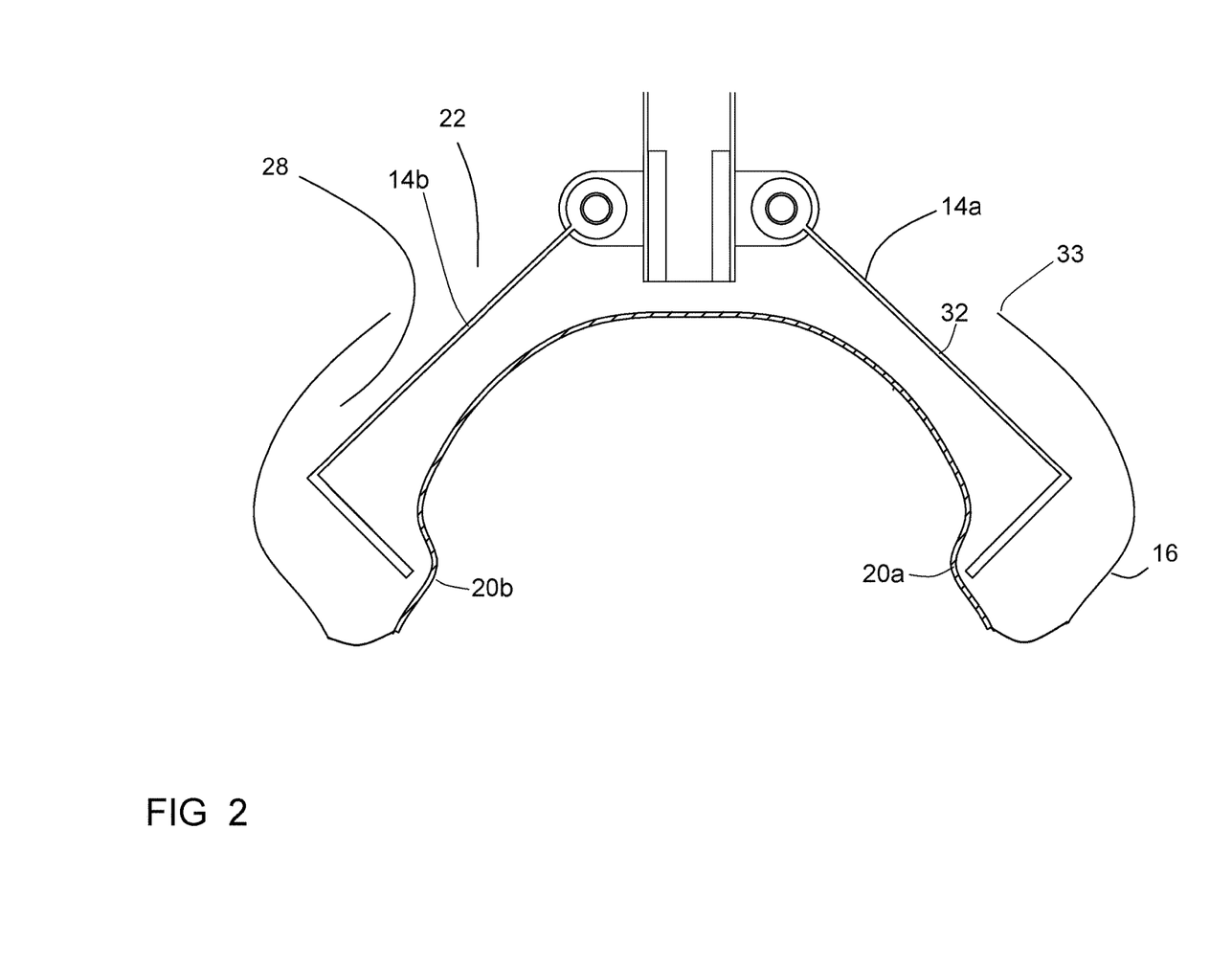
FIG. 2 is a front view of the jaw assembly of FIG. 1 at the first state.

FIG. 2 is a front view of the jaw assembly of FIG. 1 at the first state.

While jaws 14a and 14b are open, the user wears a disposable bag 16 on jaws 14a and 14b of jaw assembly 31 through an opening 22 in disposable bag 16.

According to the example, the end 33 of opening 22 reaches point 32, being approximately at the middle of jaw 14a.

Figure 3:
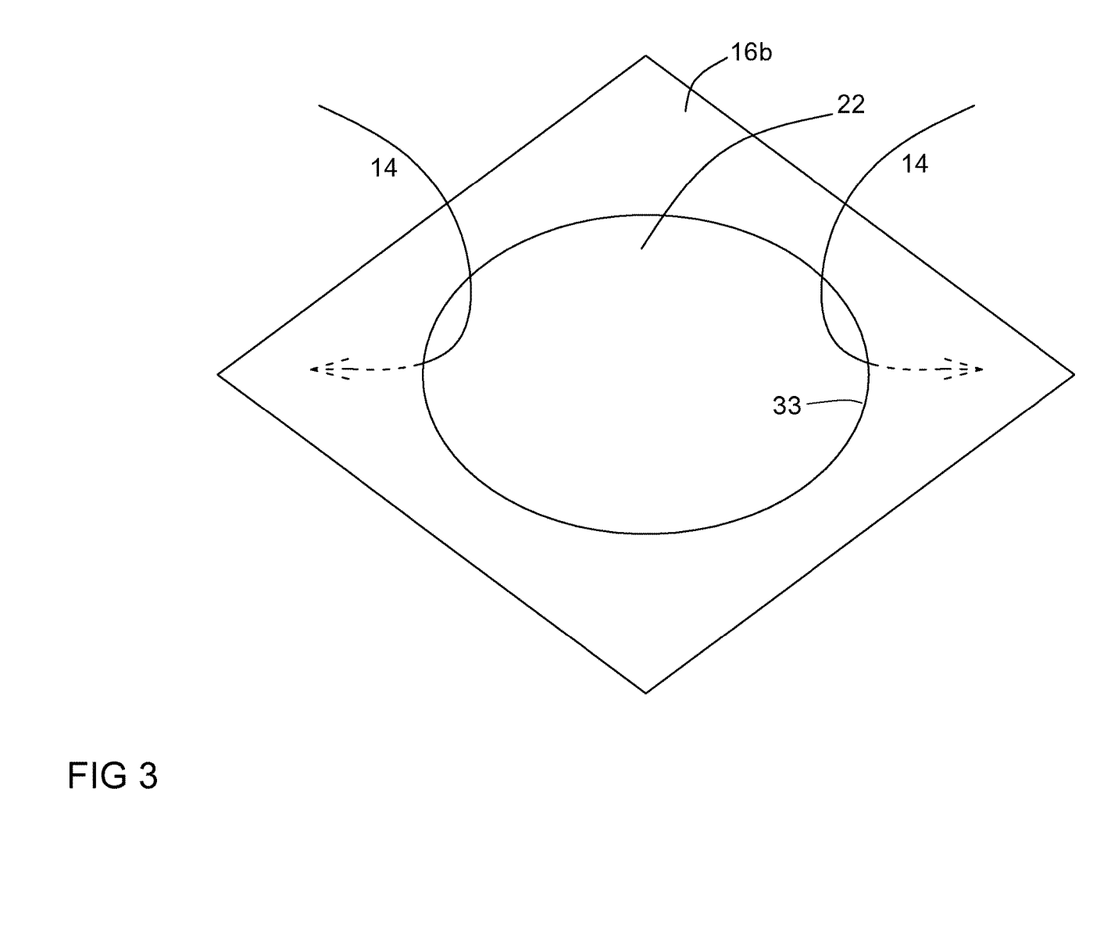
FIG. 3 is a top view of the disposable bag of FIGS. 1 and 2.

FIG. 3 is a top view of the disposable bag of FIGS. 1 and 2.

Opening 22 may be shared for both jaws 14a and 14b.

Figure 4:
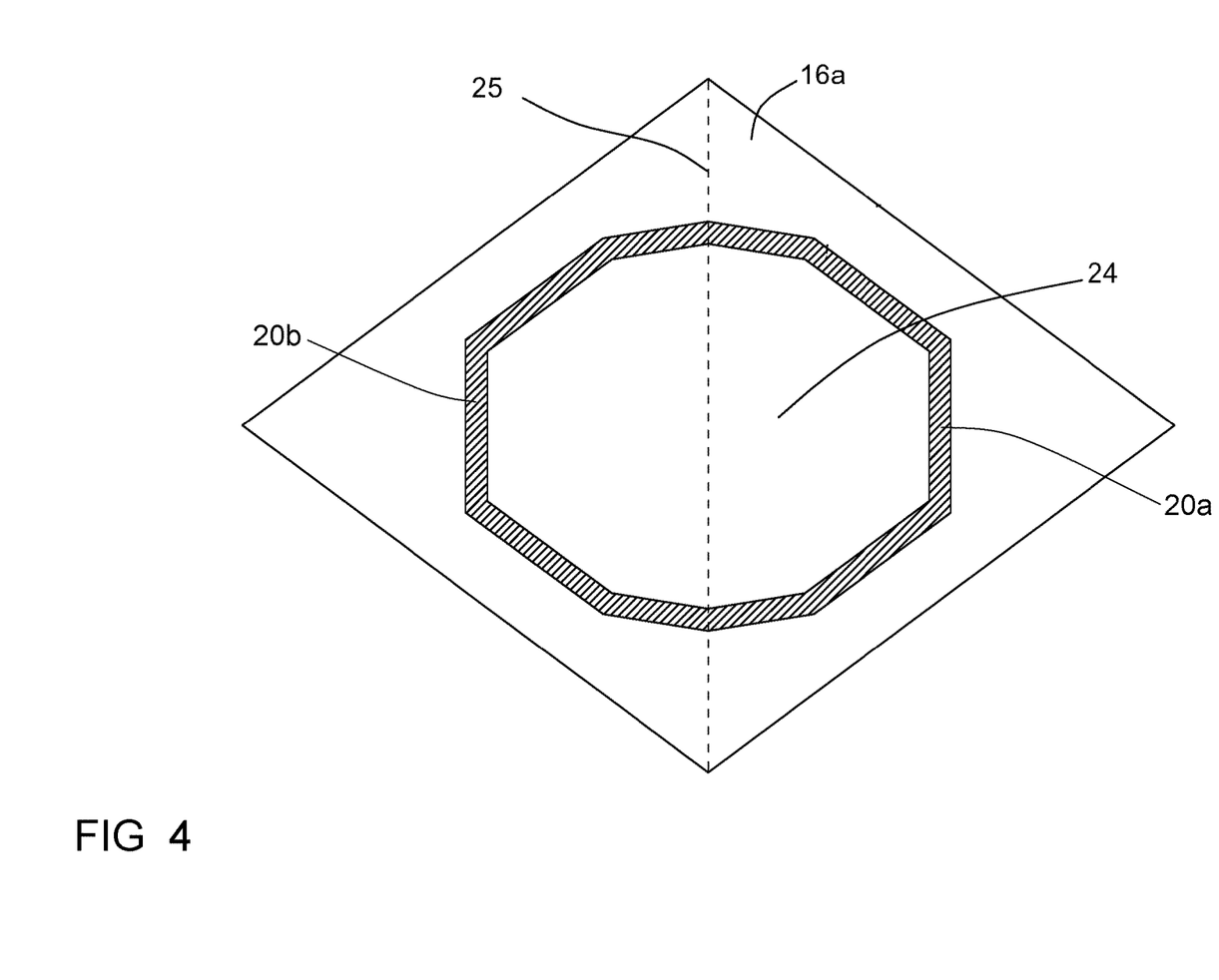
FIG. 4 is a bottom view of the disposable bag of FIGS. 1 and 2.

FIG. 4 is a bottom view of the disposable bag of FIGS. 1 and 2.

According to one embodiment, the bottom surface of disposable bag 16 includes at least sticky strips 20a and 20b being disposed symmetrically one in relation to the other. Line 25 is the symmetry line.

Figure 5:
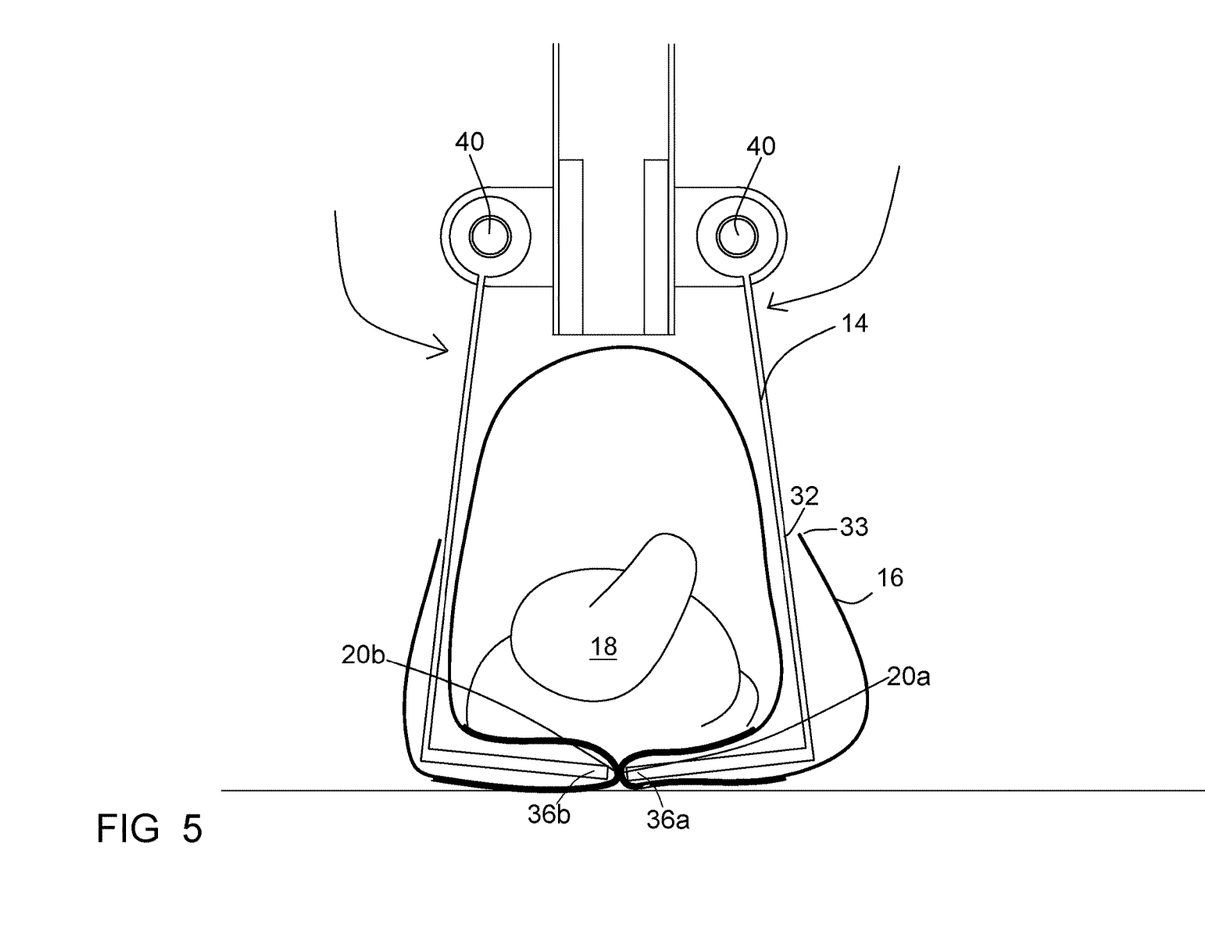
FIG. 5 is a front view of the jaw assembly of FIG. 1 at the second state.

FIG. 5 is a front view of the jaw assembly of FIG. 1 at the second state.

Then, the user operates dog feces collecting apparatus 10 to rotate jaws 14a and 14b about hinges 40 to close them one towards the other to the second state, in which end 36a of jaw 14a attempts to meet end 36b of jaw 14b. At this state, jaws 14a and 14b catch feces 18.

At this state strips 20a and 20b meet one another, and thus they stick one to the other, and thus disposable bag 16 confines feces 18.

At this state, the end 33 of opening 22 yet reaches point 32 of jaw 14a.

Figure 6:
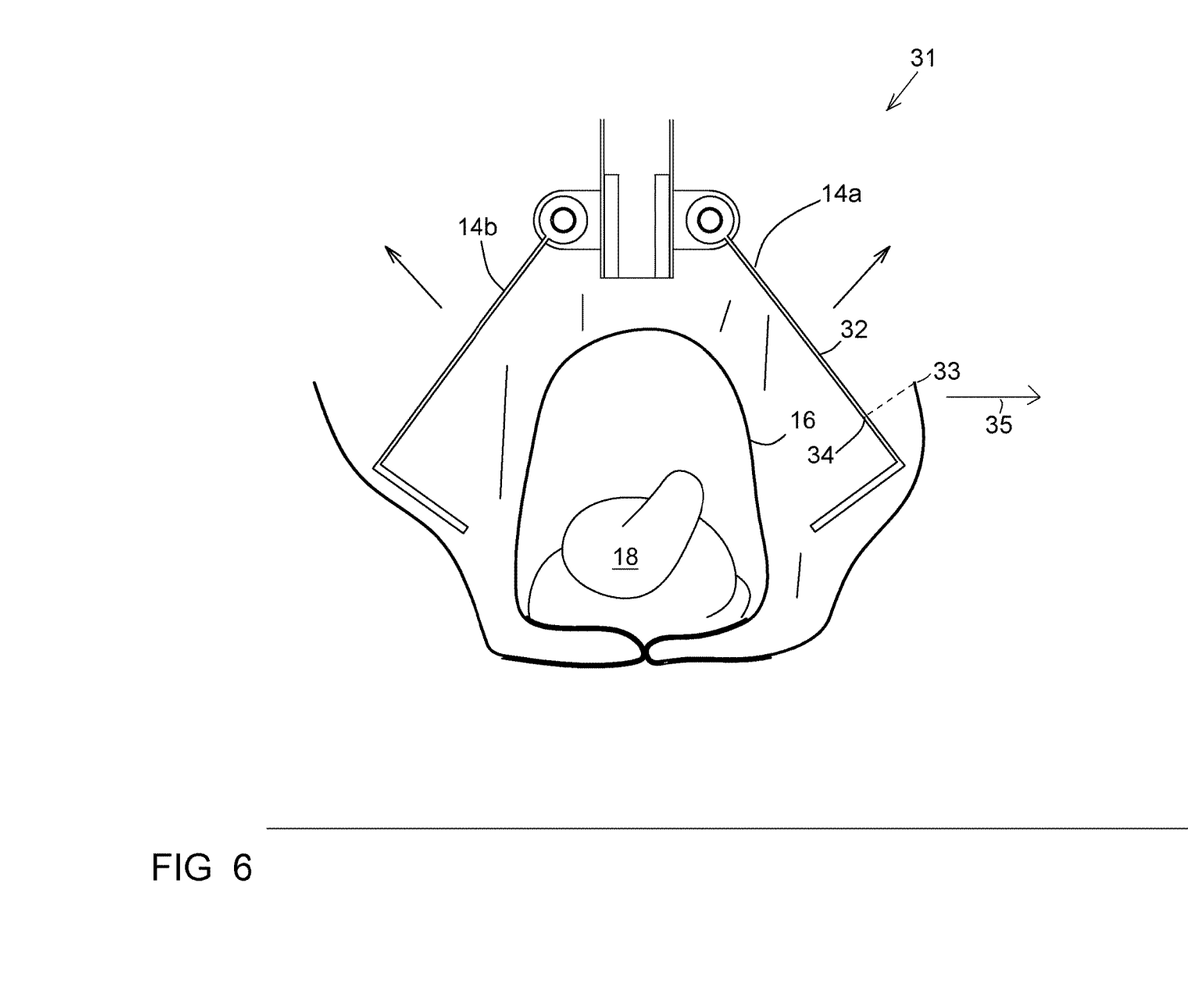
FIG. 6 is a front view of the jaw assembly of FIG. 1 at the third state.

FIG. 6 is a front view of the jaw assembly of FIG. 1 at the third state.

Then, after changing the location, the user operates dog feces collecting apparatus 10 for opening jaw assembly 31 to the third state. Jaws 14a and 14b are drawn away one from the other. However, since strips 20a and 20b of disposable bag 16 are stuck one to the other, each of jaws 14a and 14b slides in relation to disposable bag 16.

Thus, at the third state, the end 33 of opening 22 cannot reach point 32 of jaw 14a, but rather can reach point 34 only.

Further the horizontal vector of the motion of jaws 14a and 14b provides moves end 33 horizontally as depicted by arrow 35.

Figure 7:
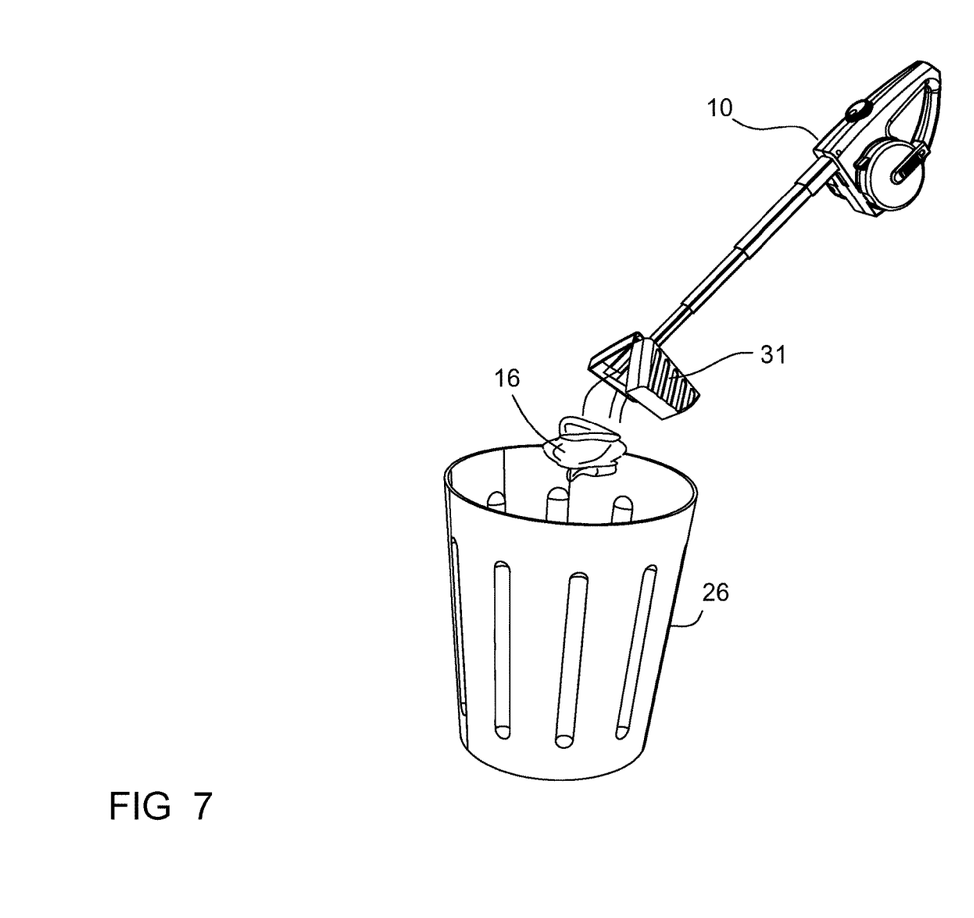
FIG. 7 is a perspective view of the dog feces collecting apparatus of FIG. 1, at the third state.

FIG. 7 is a perspective view of the dog feces collecting apparatus of FIG. 1, at the third state.

The mass of feces 18 downwards further tends to separate bag 16 from jaws assembly 31. Thus, at the third state, bag 16 falls down to the trash 26.

Figure 8:
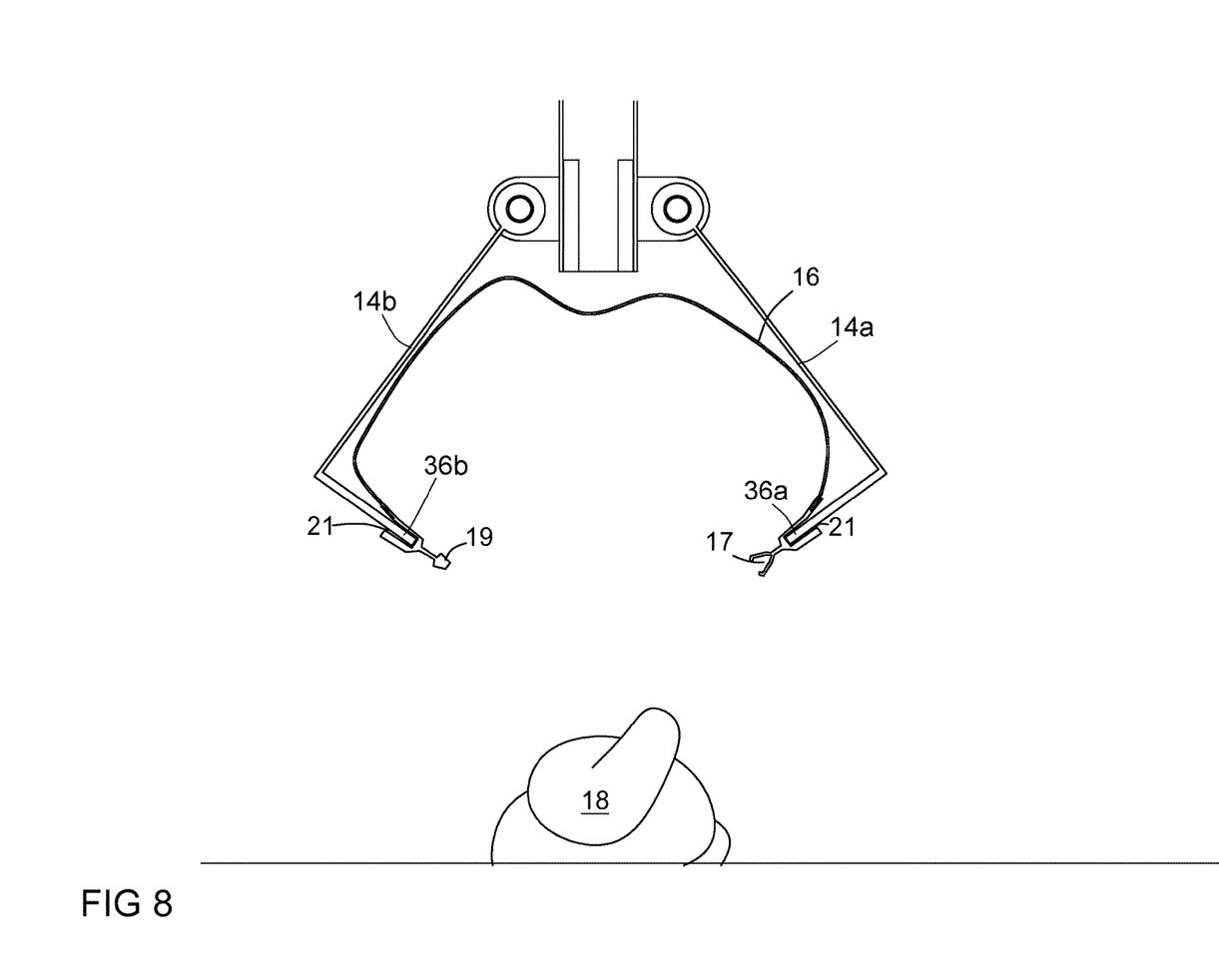
FIG. 8 is a front view of the jaw assembly of FIG. 1 at the first state, according to another embodiment.

FIG. 8 is a front view of the jaw assembly of FIG. 1 at the first state, according to another embodiment.

According to another embodiment, bag 16 includes springy loops 21, for attaching ends 36a and 36b of the jaws; and complementary fastening elements 17 and 19 extending from springy loops 21.

While jaws 14a and 14b are open, the user attaches springy loops 21 on ends 36a and 36b of the jaws 14a and 14b respectively.

Figure 9:
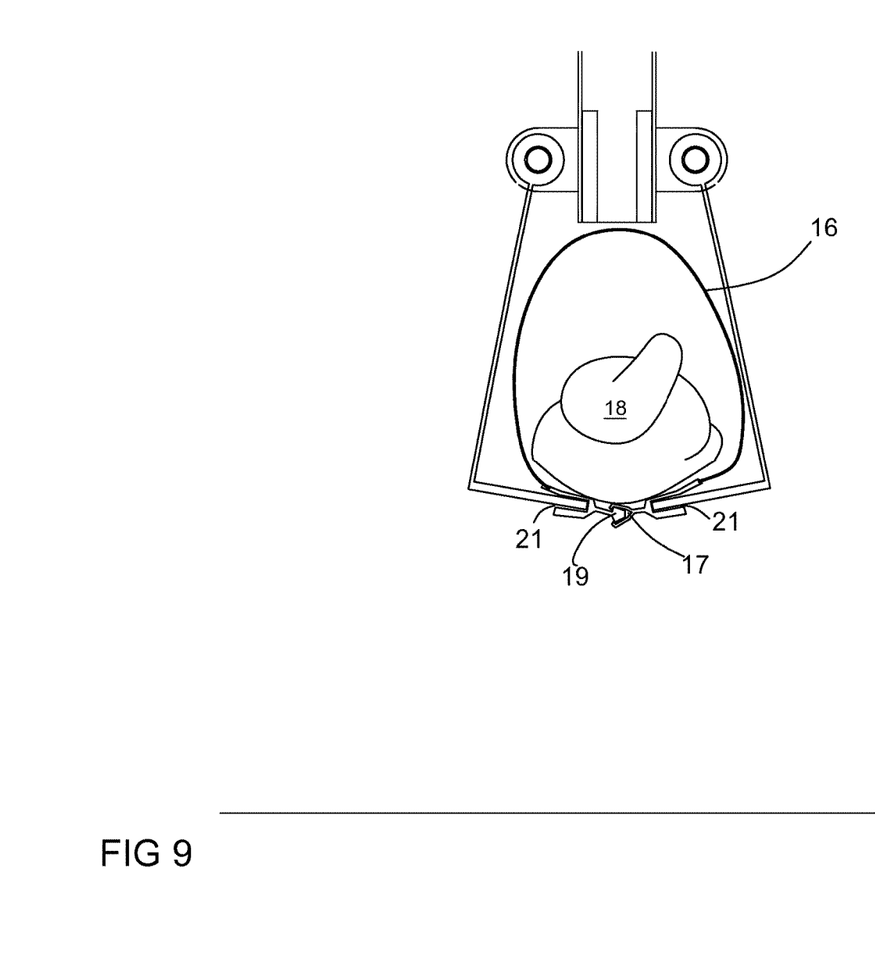
FIG. 9 is a front view of the jaw assembly of FIG. 8 at the second state.

FIG. 9 is a front view of the jaw assembly of FIG. 8 at the second state.

Then, the user operates dog feces collecting apparatus 10 to close jaws 14a and 14b one towards the other to the second state, in which end 36a of jaw 14a attempts to meet end 36b of jaw 14b. At this state, jaws 14a and 14b catch feces 18.

At this state complementary fastening elements 17 and 19 meet one another, and thus they stick one to the other, and thus disposable bag 16 confines feces 18.

Figure 10:
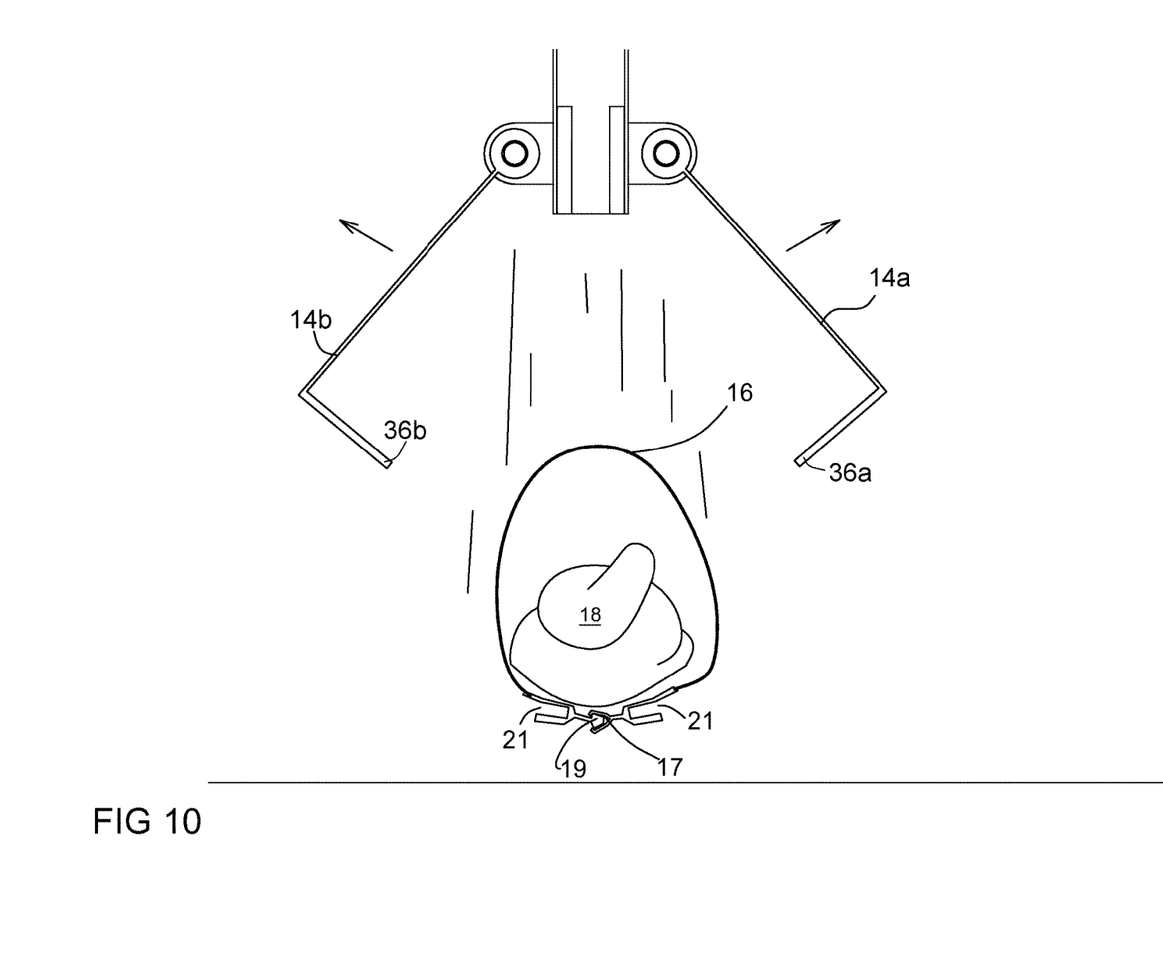
FIG. 10 is a front view of the jaw assembly of FIG. 8 at the third state.

FIG. 10 is a front view of the jaw assembly of FIG. 8 at the third state.

Then, after changing the location, the user operates dog feces collecting apparatus 10 for opening jaw assembly 31 to the third state. Jaws 14a and 14b are drawn away one from the other. However, since complementary fastening elements 17 and 19 of disposable bag 16 are stuck one to the other, each of jaws 14a and 14b slides in relation to disposable bag 16.

Thus, each of end 36a of jaw 14a and of end 36b of jaw 14b exits its springy loop 21 of bag 16.

The mass of feces 18 downwards further tends to separate bag 16 from jaws assembly 31. Thus, at the third state, bag 16 falls down, without requiring hand touching of bag 16.

Thus, in one aspect, the invention is directed to a dog feces collecting apparatus (10), including:
at least two jaws (14a, 14b), being rotatable (40) one in relation to the other; and
a disposable bag (16), comprising:
a) means (22, 17, 19), for manually connecting the disposable bag (16) to the jaws (14a, 14b) while the ends (36a, 36b) of the jaws (14a, 14b) are drawn apart one from the other; and
b) attaching means (20a, 20b, 17, 19), for attaching portions of the disposable bag (16) meeting one another upon meeting of ends (36a, 36b) of the jaws (14a, 14b), thereby upon drawing the ends (36a, 36b) of the least two jaws (14a, 14b) apart one from the other, the attaching means (20a, 20b, 17, 19) removes the disposable bag (16) from at least one of the jaws (14a, 14b).

The means (22, 17, 19), for manually connecting the disposable bag (16) to the at least two jaws (14a, 14b) may include an opening (22) for inserting the jaws (14a, 14b) therethrough, or an opening (22) for each jaw.

The means (22, 17, 19), for manually connecting the disposable bag (16) to the jaws (14a, 14b) may include springy loops (21) for connecting the loops (21) to the ends (36a, 36b) of the jaws (14a, 14b).

The attaching means (20a, 20b, 17, 19) of the disposable bag (16) may include at least two sticky strips (20a, 20b) disposed on the portions of the disposable bag (16) intended to meet one another upon meeting of the ends (36a, 36b) of the at jaws (14a, 14b), for sticking one to the other.

The attaching means (20a, 20b, 17, 19) of the disposable bag (16) may include at least two complementary fastening elements (17, 19) disposed on portions of the disposable bag (16) meeting one another upon meeting of ends (36a, 36b) of the two jaws (14a, 14b), for connecting one to the other.

In another aspect, the invention is directed to the disposable bag (16) for dog feces, including:
means (22, 17, 19) for connecting the disposable bag (16) to at least two jaws (14a, 14b) while the ends (36a, 36b) of the two jaws (14a, 14b) are drawn apart one from the other; and
attaching means (20a, 20b, 17, 19), for attaching portions of the disposable bag (16) meeting one another upon meeting of ends (36a, 36b) of the jaws (14a, 14b),
thereby the attaching means (20a, 20b, 17, 19) removes the disposable bag (16) from at least one of the jaws (14a, 14b) upon drawing the at ends (36a, 36b) of the least two jaws (14a, 14b) apart one from the other.

The means (22, 17, 19), for manually connecting the disposable bag (16) to the jaws (14a, 14b) may include at least one opening (22) for inserting the jaws (14a, 14b) therethrough.

The means (22, 17, 19), for manually connecting the disposable bag (16) to the jaws (14a, 14b) may include springy loops (21) for connecting to the ends (36a, 36b) of the at least two jaws (14a, 14b).

The attaching means (20a, 20b, 17, 19) of the disposable bag (16) may include at least two sticky strips (20a, 20b) disposed on portions of the disposable bag (16) meeting one another upon meeting of ends (36a, 36b) of the jaws (14a, 14b), for sticking one to the other.

The attaching means (20a, 20b, 17, 19) of the disposable bag (16) may include at least two complementary fastening elements (17, 19) disposed on portions of the disposable bag (16) meeting one another upon meeting of ends (36a, 36b) of the at least two jaws (14a, 14b), for connecting one to the other.

In the figures and/or description herein, the following reference numerals (Reference Signs List) have been mentioned:
numeral 10 denotes the dog feces collecting apparatus 10, according to one embodiment of the invention;
numeral 12 denotes a telescopic rod, for extending the elements thereof, for bringing the jaws near the feces;
numerals 14a and 14b denote the jaws;
numeral 16 denotes the disposable bag, according to one embodiment of the invention;
numeral 17 denotes a fastening element of the disposable bag, for catching another fastening element of the disposable bag;
numeral 18 denotes the dog feces;
numeral 19 denotes a fastening element of the disposable bag, for catching another fastening element of the disposable bag;
numerals 20a and 20b denote sticky strips or points of the disposable bag for sticking one to the other upon meeting;
numeral 21 denotes a springy loop of the disposable bag, for attaching to the jaw;
numeral 22 denotes an opening of the disposable bag;

numerals 25 denotes a symmetry line;
numeral 26 denotes the trash;
numeral 30 denotes a handle;
numeral 31 denotes a jaws assembly;
numeral 32 denotes a point;
numeral 33 denotes an end point of the opening;
numeral 34 denotes a point;
numeral 35 denotes an arrow;
numerals 36a and 36b denote ends of the jaws;
numeral 40 denotes a hinge providing rotatablity of a jaw;

The foregoing description and illustrations of the embodiments of the invention has been presented for the purposes of illustration. It is not intended to be exhaustive or to limit the invention to the above description in any form.

Any term that has been defined above and used in the claims, should to be interpreted according to this definition.

The reference numbers in the claims are not a part of the claims, but rather used for facilitating the reading thereof. These reference numbers should not be interpreted as limiting the claims in any form.

What is claimed is:

1. A dog feces collecting apparatus (10) comprising at least two jaws (14a, 14b) having a first jaw and a second jaw, wherein the first jaw is being rotatable (40) relative to the second jaw and; a disposable bag (16) comprising:
   a) a pair of springy loops (21) for connecting each of said springy loops (21) to a respective end (36a, 36b) of each of said at least two jaws (14a, 14b) for manually connecting said disposable bag (16) to said at least two jaws (14a, 14b) while said end (36a) of said first jaw is drawn apart from said end (36b) of said second jaw; and
   b) attaching means (20a, 20b) for attaching portions of said disposable bag (16) upon said ends (36a, 36b) of said at least two jaws (14a, 14b) meeting together, and wherein drawing said ends (36a, 36b) of said least two jaws (14a, 14b) separately apart, said attaching means (20a, 20b) removes said disposable bag (16) from at least one of said jaws (14a, 14b).

2. The dog feces collecting apparatus (10) according to claim 1, wherein said disposable bag (16) further comprises at least one opening (22) for inserting said at least two jaws (14a, 14b) therethrough.

3. The dog feces collecting apparatus (10) according to claim 1, wherein said attaching means (20a, 20b) of said disposable bag (16) comprises at least two sticky strips (20a, 20b) disposed on portions of said disposable bag (16).

4. The dog feces collecting apparatus (10) according to claim 1, wherein said disposable bag (16) further comprises at least two complementary fastening elements (17, 19) disposed on portions of said disposable bag (16) upon meeting of said ends (36a, 36b) of said at least two jaws (14a, 14b).

5. A disposable bag (16) for dog feces configured to be attached to an apparatus (10) comprising the apparatus having at least two jaws (14a, 14b) having a first jaw and a second jaw, a pair of springy loops (21) for connecting each of said springy loops (21) to a respective end (36a, 36b) of each of said at least two jaws (14a, 14b) for manually connecting said disposable bag (16) to said at least two jaws (14a, 14b) while said end (36a) of said first jaw is drawn apart from said end (36b) of said second jaw; and attaching means (20a, 20b) for attaching portions of said disposable bag (16) upon said ends (36a, 36b) of said at least two jaws (14a, 14b) meeting together, thereby said attaching means (20a, 20b) removes said disposable bag (16) from at least one of said two jaws (14a, 14b) upon drawing said at said ends (36a, 36b) of said least two jaws (14a, 14b) separately apart.

6. The disposable bag (16) according to claim 5, further comprising at least one opening (22) for inserting said at least two jaws (14a, 14b) therethrough.

7. The disposable bag (16) according to claim 5, wherein said attaching means (20a, 20b) of said disposable bag (16) comprises at least two sticky strips (20a, 20b) disposed on portions of said disposable bag (16).

8. The disposable bag (16) according to claim 5, further comprising at least two complementary fastening elements (17, 19) disposed on portions of said disposable bag (16) upon meeting of said ends (36a, 36b) of said at least two jaws (14a, 14b).

* * * * *